United States Patent [19]

Ringer

[11] Patent Number: 4,522,546
[45] Date of Patent: Jun. 11, 1985

[54] CONTAINER-HANDLING SYSTEM WITH RAIL/RAIL AND ROAD/RAIL TRANSFER

[76] Inventor: Karl Ringer, Frauenberg 30, 7967 Bad Waldsee, Fed. Rep. of Germany

[21] Appl. No.: 418,294

[22] Filed: Sep. 15, 1982

[30] Foreign Application Priority Data

Sep. 16, 1981 [DE] Fed. Rep. of Germany ....... 3136687

[51] Int. Cl.³ ............................................. B65G 67/00
[52] U.S. Cl. ..................................... 414/343; 104/48; 414/401
[58] Field of Search ............... 414/340, 341, 343, 396, 414/401, 584, 786, 345, 347, 498, 750, 339, 346, 348; 104/48

[56] References Cited

U.S. PATENT DOCUMENTS

| | | | |
|---|---|---|---|
| 1,207,237 | 12/1916 | Stuart | 414/399 |
| 1,783,363 | 12/1930 | Grob | 414/343 X |
| 1,830,740 | 11/1931 | Leech et al. | 414/396 |
| 2,416,071 | 2/1947 | Shonnard | 414/343 X |
| 2,512,798 | 6/1950 | Hodges | 414/341 |
| 2,691,450 | 10/1954 | Rosenbaum | 414/343 |
| 2,892,554 | 6/1959 | Decker | 414/340 X |
| 3,357,582 | 12/1967 | Wittek | 414/341 X |
| 3,807,532 | 4/1974 | Molt | 104/258 X |
| 4,093,084 | 6/1978 | Ringer | 414/134 |

FOREIGN PATENT DOCUMENTS

| | | | |
|---|---|---|---|
| 1196573 | 3/1966 | Fed. Rep. of Germany. | |
| 166701 | 1/1921 | United Kingdom | 414/343 |

OTHER PUBLICATIONS

*Schienen Der Welt*, Jan. 1971, pp. 31/3-34/6.

*Primary Examiner*—Joseph E. Valenza
*Assistant Examiner*—Stuart J. Millman
*Attorney, Agent, or Firm*—Karl F. Ross; Herbert Dubno

[57] ABSTRACT

A railroad station with at least two main tracks for freight trains with container-carrying flatcars has several pairs of ancillary tracks each flanking a respective main track, the ancillary tracks being used by respective sets of self-propelled transfer vehicles each having a length substantially corresponding to that of a flatcar. Each transfer vehicle is divided into four identical sections having respective pairs of transport arms which are laterally extendable in either direction to support containers of full or fractional lengths to be moved from or onto a flatcar, another transfer vehicle or a road vehicle aligned therewith. The spacing of the transport arms of each pair differs between vehicles on neighboring ancillary tracks to enable their extension into an interleaved position for a transfer of a container therebetween. Vehicles on an ancillary track adjoining a roadway have adjustable mountings enabling an orientation of the container axis parallel to the axis of a juxtaposed truck which is not entirely parallel to the tracks; precise alignment of a transfer vehicle with a flatcar, another transfer vehicle or a track is controlled by a vehicle-borne microprocessor responsive to signals from associated position sensors. A computer with information regarding the destination of containers to be transferred to different trains determines the order in which containers loaded on vehicles of one set are shifted to vehicles of an adjacent set preparatorily to their reloading onto respecive flatcars.

8 Claims, 24 Drawing Figures

CONTAINER-HANDLING SYSTEM WITH RAIL/RAIL AND ROAD/RAIL TRANSFER

FIELD OF THE INVENTION

My present invention relates to a system for handling freight containers at a railroad station to facilitate their transshipment between flatcars of different trains, or between trains and road vehicles (referred to hereinafter as trucks).

BACKGROUND OF THE INVENTION

In my prior U.S. Pat. No. 4,093,084 I have disclosed a system of this general nature in which modular loads, such as stardard-size containers, are transferred by computer-controlled conveyors between flatcars of a train halting at a railroad station and loading/unloading bays accommodating trucks adapted to carry such containers. The computer is fed information regarding the destination of oncoming containers to be transshiped, their locations on an arriving freight train, and vacancies aboard an outgoing train onto which containers with corresponding destinations can be loaded. The patented system eliminates the usual yard switching and simplifies the road/rail interchange but requires rather substantial modifications of existing railroad stations.

German Pat. No. 1,196,573 describes a system for the transfer of containers, pallets or the like between cars of a freight train and a stationary ramp through the intermediary of a shorter auxiliary train whose cars are flexibly interconnected for alignment with respective freight cars to be loaded or unloaded, the cars of the auxiliary train being provided with wheeled carriages shiftable across the gaps between the auxiliary train and the freight train or the ramp whereupon a roller-supported platform can convey the load over the carriage; the carriages are elevated to pick up the loads to be transferred and are lowered for redepositing them on the areas assigned to them. An elevatable transfer unit of Japanese construction has been described in a 1971 issue of the German-language railroad magazine titled "Schienen der Welt".

OBJECTS OF THE INVENTION

The general object of my present invention is to provide an improved system for the rail/rail or road/rail transfer of standard-size containers designed to save time, economize on the use of fuels, minimize the space required in a railroad station for transshipment, and thus make the utilization of rail services for long-distance freight hauling commercially more attractive.

More particularly, my invention aims at more fully utilizing the load-carrying capacity of freight trains and expediting the loading and unloading of their flatcars so as to reduce to a minimum (e.g. to about 3 minutes) the delay of such trains in a railroad station serving as a transfer point, thereby enabling the scheduling of freight trains with headways corresponding to those of passenger trains running on the same tracks or the use of combined freight/passenger trains.

It is also an object of my invention to provide a method of operating such system, especially as concerns the transfer of containers from an arriving freight train to flatcars of one or more later trains with suitable destinations, which obviates the need for stationing the containers on ramps or parking areas between unloading and reloading but allows their computer-controlled realignment, preparatorily to such reloading, entirely on track-borne vehicles.

A further object of my invention is to accommodate containers of different standardized lengths based on a unit length which is a submultiple of the length of a flatcar, specifically containers 10, 20, 30 or 40 feet in length conforming to the regulations of the International Standardization Organization (ISO).

SUMMARY OF THE INVENTION

Pursuant to an important feature of my invention, a main track used by freight trains with container-carrying flatcars is flanked in a railroad station by a pair of ancillary tracks on which respective sets of self-propelled transfer vehicles are independently movable. Each transfer vehicle is equipped with support means extendable transversely to the tracks for enabling movement of a selected container onto such vehicle from a flatcar aligned therewith or, vice versa, from the vehicle to the flatcar, the support means being further extendable across at least part of the main track in the absence of a train thereon for facilitating a movement of a container from a transfer vehicle of one set onto an aligned transfer vehicle of the other set.

When the station has several main tracks parallel to one another on which trains can travel to different destinations, each main track is advantageously flanked by an associated pair of ancillary tracks; adjoining ancillary tracks from two such pairs should then lie close enough to each other to permit a shifting of containers between transfer vehicles respectively riding these ancillary tracks. An ancillary track adjoining a roadway allows for the transshipment of containers between its rail-borne transfer vehicles and trucks aligned therewith on the roadway.

According to another feature of my invention, each transfer vehicle is preferably equipped with sensing means for detecting longitudinal offsets between such vehicle and either a flatcar, a similar vehicle on an adjoining track, or a truck substantially aligned therewith. The final alignment is carried out by the vehicular drive under the control of a microprocessor aboard the vehicle responding to information received from the associated sensing means. For transshipment between a transfer vehicle and a truck, the microprocessor must also take into account a possible relative inclination of the truck axis and the axis of the transfer vehicle as determined by further sensing means carried on adjustable mounting means aboard the vehicle by which a container supported thereon can be horizontally swung into parallelism with either of these axes preparatorily to a transferral thereof.

Yet a further feature of my invention relates to the structure of the support means extendable toward an adjoining track or a roadway. With each transfer vehicle advantageously comprising a wheeled base on which a plurality of independently elevatable platforms or other superstructures adjoin one another in the longitudinal direction of the vehicle (i.e. in the direction of the tracks) for engagement with individual unit-size containers as discussed above, I prefer to design the support means as a pair of transversely extending transport arms on each superstructure and to make the separation of the transport arms of each pair identical for all sections of the same set of vehicles but different from the separation thereof on the vehicles present on an adjoining track so that the arms of two aligned vehicles can be extended toward each other in an interleaved position facilitating the takeover of a container by one pair of transport arms from the other pair. The transfer vehicles preferably have a width substantially exceeding that of the associated main track so that their transport arms, while being fully retractable into the vehicles, can be made long enough to project with half their length or less beyond the vehicles in their fully extended positions in which the containers pass over their cantilevered extremities. Tilting of the vehicles during such passage can be prevented by providing each vehicle with railhead-gripping means operable to anchor the vehicle to its ancillary track during lateral extension of any of its pairs of transport arms.

For an expeditious unloading of containers from flatcars of a freight train arriving on a main track of a railroad station preparatorily to a reloading thereof into available spaces of flatcars of one or more subsequently arriving trains with destinations corresponding to those of the unloaded containers, as determined by a computer receiving routing and loading information as described in my above-identified prior patent, a container-handling method according to my invention essentially comprises the following steps:

(a) Self-propelled first transfer vehicles on a first ancillary track adjacent the main track, as described above, are aligned with respective flatcars carrying the containers to be unloaded for transshipment by rail;

(b) a corresponding number of second transfer vehicles are provided on a second ancillary track paralleling the first track;

(c) the containers to be transshipped are unloaded from the flatcars, in the relative positions of their arrival, onto the first transfer vehicles respectively aligned therewith;

(d) the second transfer vehicles provided in step (b) are successively aligned, in a sequence determined by the computer, with respective first transfer vehicles carrying the unloaded containers; and (e) the containers carried on the first transfer vehicles are moved onto the aligned second transfer vehicles so as to follow one another in the order in which they are to be loaded onto the subsequently arriving flatcars.

The transfer vehicles utilized in steps (a) and (b) are advantageously prepositioned before the arrival of the freight train.

When the two ancillary tracks referred to are part of a pair flanking the main track, the transferral in step (e) will occur across the main track after departure of the freight train from which the containers have been unloaded and prior to the arrival of the next train on that track. Since all unloading operations as well as all intervehicle transfers can be carried out simultaneously, the train need not be halted for more than a few minutes at the station while the interval between successive trains may be of similarly short duration.

Pursuant to a more particular feature of this aspect of my invention, the computer assigns containers to be transposed to a higher-order reloading position and containers to be transposed to a lower-order reloading position to different groups discharged at opposite sides of the freight train, the aforementioned steps (c) through (e) being performed only for the containers of one group whereas the containers of the other group are unloaded in the relative positions of their arrival onto third transfer vehicles on a third ancillary track; these latter containers are thereafter moved onto respective first transfer vehicles in the order in which they are to be loaded onto subsequently arriving flatcars. The rearrangement of the containers of both groups into the positional order of their reloading is then done by codirectionally displacing the second and third transfer vehicles, relatively to the first transfer vehicles, between container movements from one such vehicle to another.

BRIEF DESCRIPTION OF THE DRAWING

The above and other features of my invention will now be described in detail with reference to the accompanying drawing in which.

SPECIFIC DESCRIPTION

I shall first refer to FIGS. 1A–1D, including their extensions 1A(x)–1D(x) and 1A(y)–1D(y), showing part of a railroad station serving as a transfer point for containers destined for rail/road or road/rail transshipment. The station comprises two main tracks G', G", which may be respectively included in a west-to-north and a south-to-east route, for example, each flanked by an associated pair of ancillary tracks I, II, and III, IV. The six tracks, all parallel to one another, lie between two roadways W' and W" respectively adjoining tracks I and IV. The ancillary tracks I–IV have end zones SA serving as storage areas for respective sets of self-propelled transfer vehicles 101–108, 201–208, 301–308 and 401–408. The number of vehicles per set, here eight, is slightly less than half the number of flatcars $C_1$–$C_{20}$ of a container-carrying freight train CT shown resting on main track G' in FIGS. 1A, 1A(x) and 1A(y), it being assumed in this instance that not more than eight flatcars of such a 20-car train will have to be unloaded or loaded during its stop at that station; in practice, however, the number of flatcars of such a freight train may be much larger, e.g. up to 50, calling for a corresponding increase in the number of available transfer vehicles. A locomotive pulling the train CT has been shown at LC.

A nonillustrated computer associated with the station stores information indicating that, again by way of example, cars $C_3$, $C_5$, $C_{11}$, $C_{14}$, $C_{17}$ are $C_{18}$ carry containers to be unloaded, that the containers to be removed from cars $C_3$, $C_{11}$ and $C_{17}$ are to be transferred to trucks for further transportation by road, and that the destinations of the containers on cars $C_5$, $C_{14}$ and $C_{18}$ are such as to require their reloading onto cars Nos. 12, 4 and 8 of a subsequent freight train, respectively. The computer also knows that cars $C_5$, $C_{10}$, $C_{11}$ and $C_{14}$ of train CT have or will have space available for containers waiting on roadside transfer vehicles 103, 105 and on trackside transfer vehicles 203, 204 for further transportation by rail.

Figure 1A:
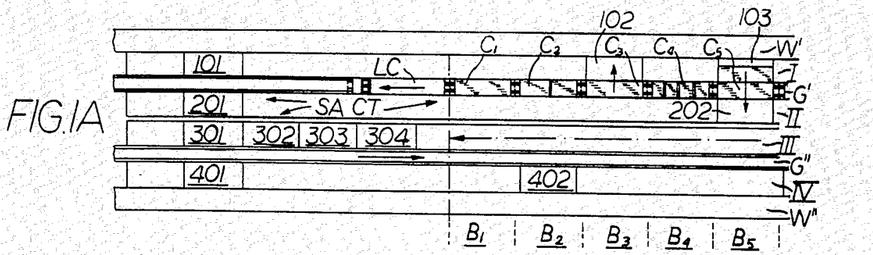
FIGS. 1A–1D, with respective rightward extensions designated (x) and (y), are diagrammatic plan views of the layout of a railroad station embodying my invention, showing four different phases of operation.

FIGS. 1A, 1A(x) and 1A(y) further show thirty bays $B_1$–$B_{30}$, each having a width equal to the length of a railroad car including associated coupling halves, which have no physical function but merely mark the position with which the flatcars of train CT are substantially aligned by the engineer upon arrival at the sation and toward which various transfer vehicles are to be directed by the computer (preferably in advance) for loading and/or unloading purposes. Thus, with train CT standing in the station, vehicles 102–106 are placed in positions $B_3$, $B_5$, $B_{11}$, $B_{14}$ and $B_{17}$, respectively, for alignment with flatcars $C_3$, $C_5$, $C_{11}$, $C_{14}$ and $C_{17}$; vehicles 202–206 are respectively aligned with flatcars $C_5$, $C_{10}$, $C_{11}$, $C_{14}$ and $C_{18}$ in positions $B_5$, $B_{10}$, $B_{11}$, $B_{14}$ and $B_{18}$ whereas the remaining vehicles of those two sets, along with vehicles 301–308, are held in the storage areas SA shown in FIGS. 1A and 1A(y). Vehicles 401–408 on track IV occupy equispaced positions along roadway W''' for maximum maneuverability of trucks arriving to meet them with outgoing containers.

After the activated vehicles on tracks I and II have been precisely aligned with the confronted flatcars, and upon unlocking of the newly arrived containers from their detents aboard the flatcars by a signal from the engineer of the train, the incoming containers are unloaded onto vehicles 104, 106, 108 for transshipment by road and onto vehicles 202, 205, 206 for further rail transportation; substantially concurrently therewith, outgoing containers are loaded from vehicles 103, 203, 204 and 105 onto flatcars $C_5$, $C_{10}$, $C_{11}$ and $C_{14}$, respectively, where they are locked in position before the departure of the train.

Figure 1B:
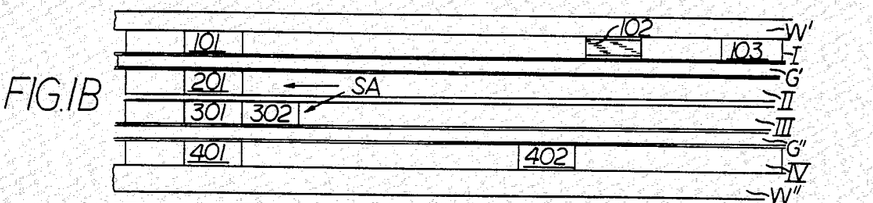
Figure 1C:
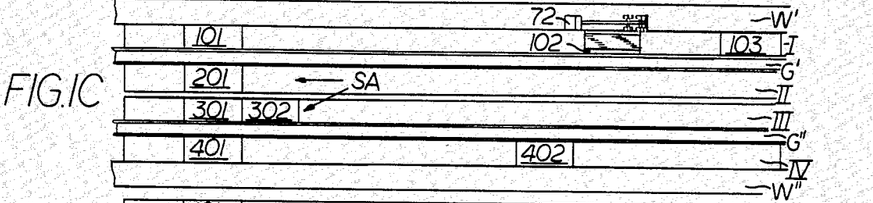
Figure 1D:
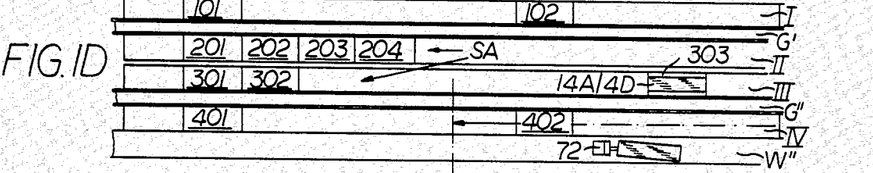

FIGS. 1B(x) and 1B(y) show the station after the train CT has left. Loaded vehicles 102, 104 and 106 on track I have remained in positions $B_3$, $B_{11}$ and $B_{17}$, as have unloaded vehicles 103 and 105 in positions $B_5$ and $B_{14}$; loaded and unloaded vehicles 202–206 on track II have closed up in positions $B_9$–$B_{13}$. The containers on vehicles 202, 205, 206 are still arrayed in ascending order of their arrival positions, marked 5A, 14A and 18A in FIG. 1B(x), and have departure positions 12D, 4D and 8D respectively assigned to them by the computer on the basis of destination and availability of space on the next freight train due to move toward their destinations on track G'''. Vehicles 303, 304 and 305 on track III have been activated and placed in positions $B_7$–$B_9$ so that the container marked 5A/12D can be transferred to the rightmost vehicle 305 of that group. Upon a subsequent relative shifting of the two vehicle groups 202–206 and 303–305, the containers marked 14A/4D and 18A/8D are transferred from vehicles 205 and 206 to vehicles 303 and 304 so as to follow one another in the order in which they are to be loaded onto outgoing flatcars; this has been illustrated in FIGS. 1C, 1C(x) and 1C(y) which also show trucks 72 arrived on roadway W' in positions $B_3$, $B_{11}$ and $B_{17}$ to receive containers from loaded vehicles 102, 104 and 106, respectively. In the phase represented by FIGS. 1D, 1D(x) and 1D(y) the vehicles 101–108 on track I have been redistributed into equispaced positions along roadway W' (not shown in these FIGURES), the vehicles on track II have been returned to storage area SA, loaded vehicles 303, 304 and 305 have been placed in the departure positions $B_4$, $B_8$ and $B_{12}$ of their loads alongside track G''', and trucks 72 on roadway W''' (the first two of them loaded) approach or have reached the positions of vehicles 402, 404 and 405.

Figures 1E, 1F:
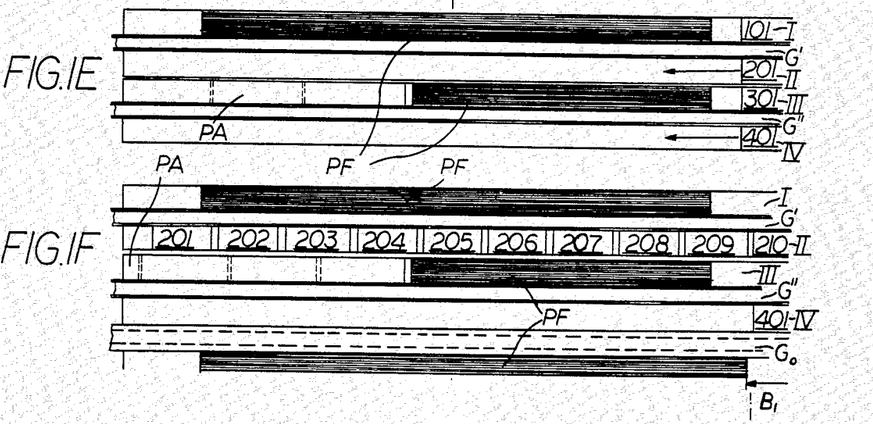
FIGS. 1E and 1F, with similar rightward extensions designated (x) and (y), are analogous views with a modified layout.
Figure 1E:
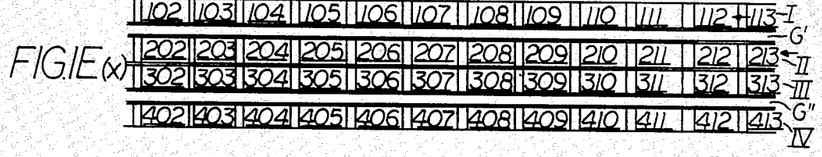
Figure 1F:
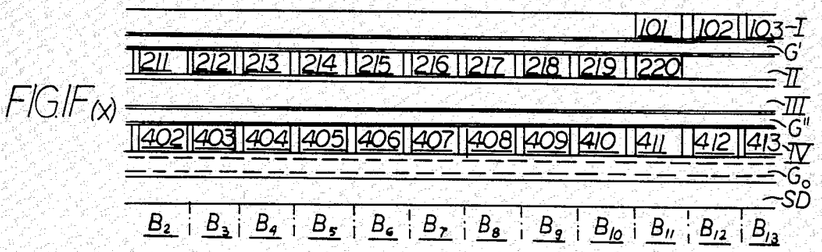

In FIGS. 1E, 1E(x), 1E(y) and 1F, 1F(x), 1F(y), which lack the roadways W' and W''', tracks I, II, III and IV are shown occupied by respective sets of closely spaced transfer vehicles 101–120, 201–220, 301–320 and 401–420 occupying positions $B_1$–$B_{20}$ along tracks G' and G'''. Containers arriving on track G' for rail/rail transshipment are classified by the computer according to whether their arrival number "A" is higher or lower than their departure number "D", i.e. whether the difference is positive or negative. Containers with positive or zero difference A-D are unloaded to vehicles on track II whereas those with negative difference A-D are unloaded to vehicles on track I. When the two sets of vehicles on tracks I and III are displaced to the right with reference to those on track II, as illustrated in FIGS. 1F, 1F(x) and 1F(y), the numerical designations of vehicles on tracks II and III temporarily aligned with each other will have progressively increasing positive differences whereas those of vehicles on tracks I and II will have progressively increasing negative differences. Whenever the computer detects a difference corresponding to the reloading position of any container on a vehicle of track II, the relative shifting of vehicles 201–220 and 301–320 on tracks II and III is halted and the affected container or containers are transferred from the former track to the latter; a similar transfer takes place from track I to track II upon detection of a difference corresponding to the reloading position of any container on a vehicle of track I. To the extent possible, these transferrals between tracks I, II and II, III are carried out simultaneously. The outgoing containers, now in the proper relative positions for reloading, may eventually be assembled on vehicles of a single set adjoining main track G' or G'''. Another track $G_0$ may lie below street level adjacent track IV so that containers on vehicles 401–420 may be transferred to trucks or to cars of a local railway, or vice versa; there are also shown parking areas PA for transfer vehicles as well as passenger platforms PF in line with the relatively staggered ancillary tracks I, III and with a siding SD. Tracks I and II extend to the right and track II extends to the left by half the length of a freight train, beyond the flatcar positions marked by bays $B_1$–$B_{20}$.

Figure 2:
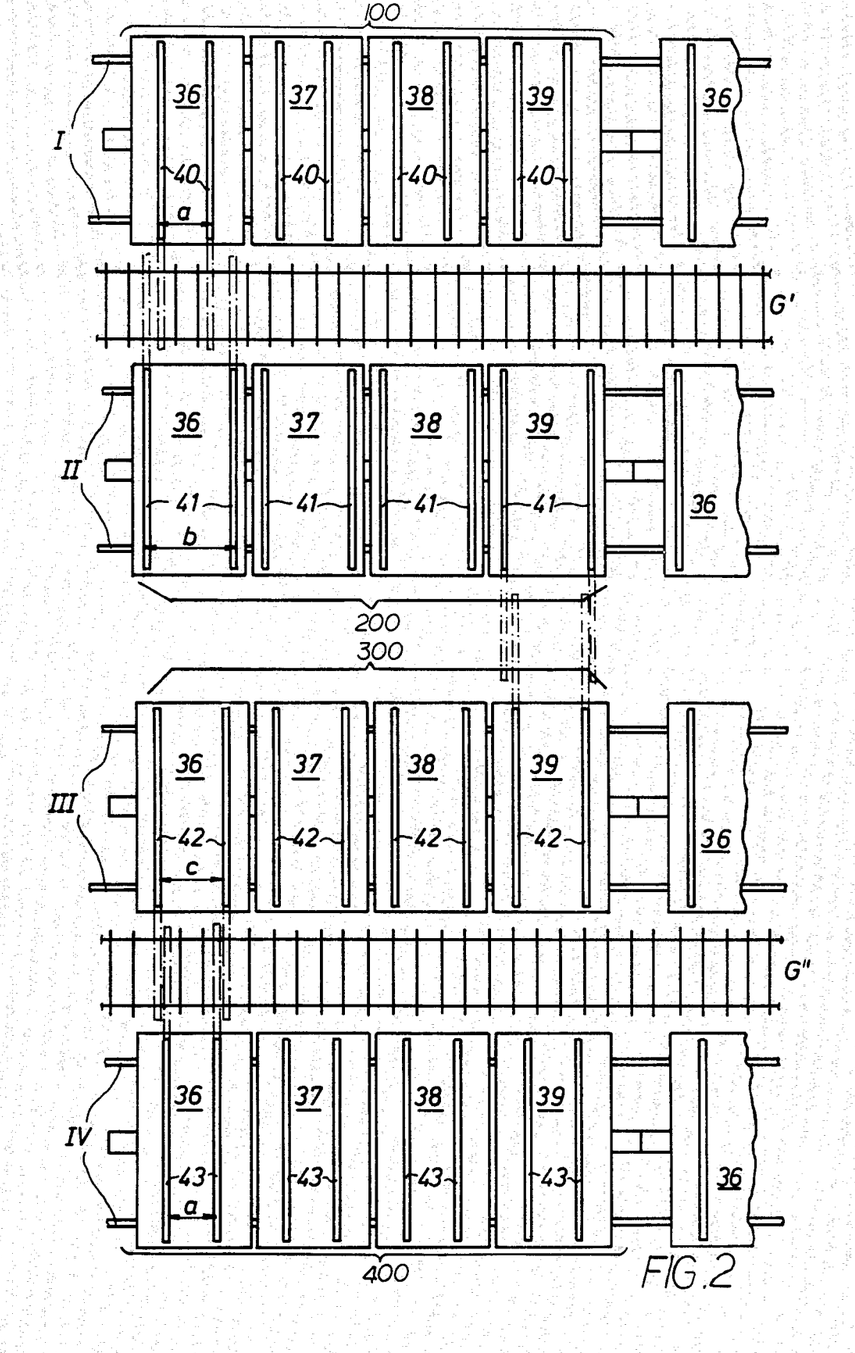
FIG. 2 is a schematic plan view, drawn to a larger scale, of four mutually aligned transfer vehicles on parallel tracks arrayed as in the preceding FIGURES.

In FIG. 2 I have diagrammatically illustrated the structure of four typical transfer vehicles 100, 200, 300 and 400 on ancillary tracks I, II, III and IV, respectively. Each transfer vehicle is divided into four identical sections 36, 37, 38 and 39 which are interconnected by couplers 46 (FIGS. 3 and 4) and, in the present instance, have a width of ten feet or about three meters corresponding to the standard axial length of a unit container. The sections of vehicles 100–400 are each provided with a pair of transport arms 40, 41, 42 and 43, respectively; the spacing of these arms in the direction of the tracks is identical for all sections of a given vehicle but differs from one vehicle to the other. More particularly, arms 40 and 43 of vehicles 100 and 400 are separated by a distance a only slightly greater than half the width of a section; arms 41 of vehicle 200 are separated by a distance b, close to that width, while the spacing c of arms 42 of vehicle 300 has an intermediate value. Thus, the pairs of transport arms of confronting sections of aligned vehicles 100 and 200, 200 and 300, or 300 and 400 are relatively offset to enable their interfitting when these arms are extended toward one another, as illustrated in phantom lines for certain sections of FIG. 2.

Also shown in FIG. 2 are the two main tracks G' and G" on which no trains are stationed at the time here considered. Arms 40 and 41 are shown extended in their phantom-line positions across track G' to facilitate the transfer of a unit container between sections 36 of vehicles 100 and 200. In a similar manner, arms 42 and 43 can be extended across track G" for the transfer of a unit container between vehicles 300 and 400. As likewise shown in phantom lines for sections 39 of vehicles 200 and 300, the arms of these vehicles can meet in interleaved relationship across the intervening gap for the transfer of a unit-length container thereacross. It will also be apparent that the arms of two, three or all four sections of a pair of juxtaposed vehicles can be similarly extended for the transfer of containers of two, three, or four unit lengths, i.e, 20, 30 or 40 feet in this specific instance.

The length of each transport arm substantially equals the width of vehicles 100–400 and measures at least twice the distance by which that arm must be extended in its working position, i.e. when a container is to be shifted to or received from another transfer vehicle, a flatcar on rail G' or G", or a truck on a roadway adjoining one of the outer ancillary tracks I, IV. In order to sustain the loads of containers temporarily resting on cantilevered extremities of such a pair of arms, the undercarriages of vehicles 100–400 are to be provided with railhead-gripping jaws 45 (FIG. 3) operative to establish a positive connection at such time between the vehicle and the roadbed.

Thus, the transfer operations described in connection with the preceding FIGURES also apply to containers occupying less than the full length of a vehicle and fitting into correspondingly reduced spaces aboard the flatcars onto which they are to be loaded.

Figure 3:
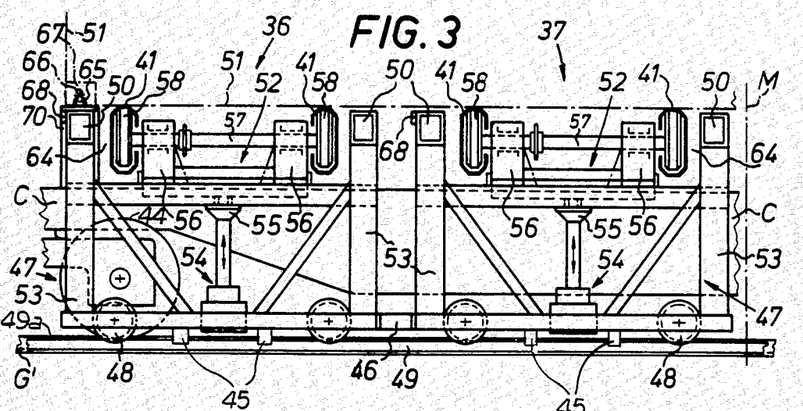
FIG. 3 is a side-elevational view of two sections of one of the transfer vehicles illustrated in FIG. 2, drawn to a still larger scale.
Figure 4:
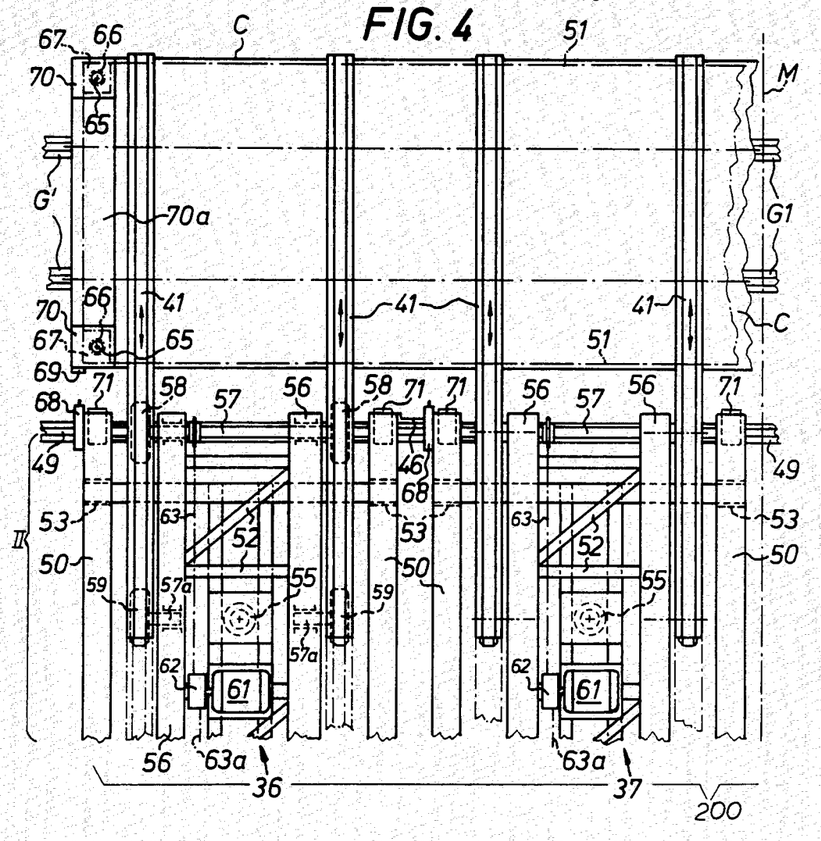
FIG. 4 is a top view of part of the vehicle sections of FIG. 3 shown aligned with a flatcar to be loaded or unloaded.

In FIGS. 3 and 4 I have shown details of sections 36 and 37 of a representative transfer vehicle 300 juxtaposed with a flatcar C; a full-length container 51 carried on flatcar C has been indicated in phantom lines. The two sections are linked with each other and with the remaining sections by releasable electromechanical couplings 46; the vehicle is symmetrical about a transverse centerline M. Each section 36–39 comprises a base 47, resting by two wheel pairs 48 on grooved rails 49 of the associated track (here II), and a superstructure 52 mounted on a piston head 55 of a hydraulic jack 54 rising from that base. One of the wheel pairs 48 of section 36 is coupled with an electric drive motor 44 which, like jacks 54, is controlled by the central computer via nonillustrated signal lines. The computer further controls clamping jaws 45 already referred to, designed to grip railheads 49a in a working position of the vehicle, and dialogues with a vehicle-borne microprocessor (not shown). Uprights 53 rigid with base 47 carry horizontal bars 50 which have abutments 71 engageable with corner fittings 67 of containers of one or more unit lengths supported by these bars in a lowered position of superstructures 52.

Each of these superstructures comprises a pair of transverse beams 56 in which a drive shaft 57 and two stub shafts 57a are journaled at each end. The illustrated drive shafts 57 as well as their counterparts at the opposite extremities of beams 56 are provided with profiled traction rollers 58 while the associated stub shafts 57a carry supporting rollers 59. The transport arms 41 of vehicle 200, which are also representative of arms 40, 42 and 43 shown in FIG. 2, are of C-shaped profile embracing the rollers 58 and 59. The traction rollers 58 of each vehicle section are powered by an electric motor 61, also controlled by the computer, via a step-down transmission 62 and chains 63, 63a.

In the position illustrated in FIG. 4, arms 41 of all four sections of vehicle 200 have been extended into clearances 64 above the floor of flatcar C to underreach the container 51 in order to transfer same to the vehicle. With jacks 54 pressurized, these arms are elevated to lift the container off sills 70 rising from the flatcar floor on which they were previously immobilized by retractable locking pins 65 received in bores 66 of their corner fittings 67. Upon a loading of a container from vehicle 200 onto flatcar C, abutments 69 on sills 70 coact with corner fittings 67 to arrest the container in a position in which it can be relocked by the re-extended pins 65.

For a precise alignment of vehicle 200 with flatcar C prior to the transfer of a container therebetween, bars 50 are provided with position sensors 68—preferably of the contactless type—coacting with markers 69 on car C to signal such alignment to the microprocessor. Thus, for example, markers 69 may reflect rays from light sources of sensors 68 to photodetectors thereof in a confronting position; additional photocells may inform the microprocessor whether a corrective displacement to the left or to the right is necessary for proper positioning. Similar sensing means serve to align transfer vehicles on adjoining ancillary tracks with each other.

Figure 5:
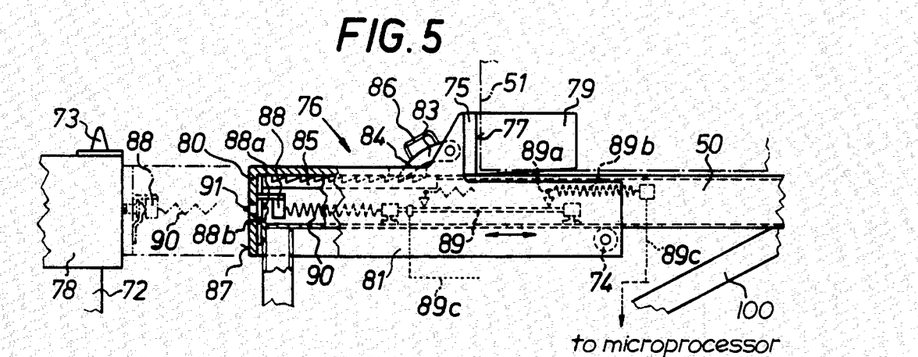
FIG. 5 shows further details, in part-sectional end view, of a vehicle section of FIG. 2 juxtaposed with a truck to be loaded or unloaded.
Figure 6:
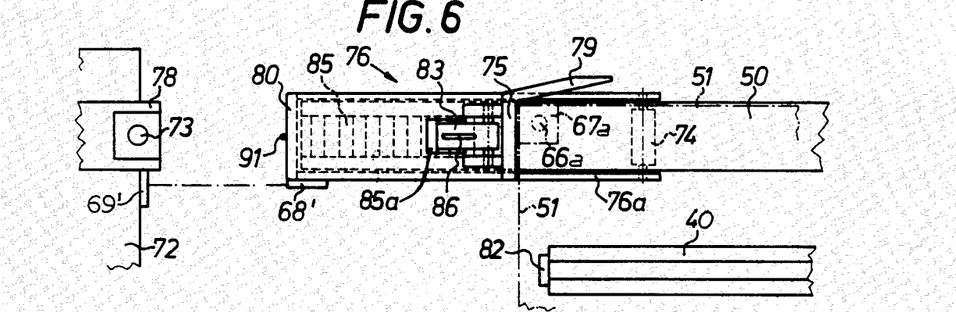
FIG. 6 is a top view of the elements shown in FIG. 5.
Figure 7:
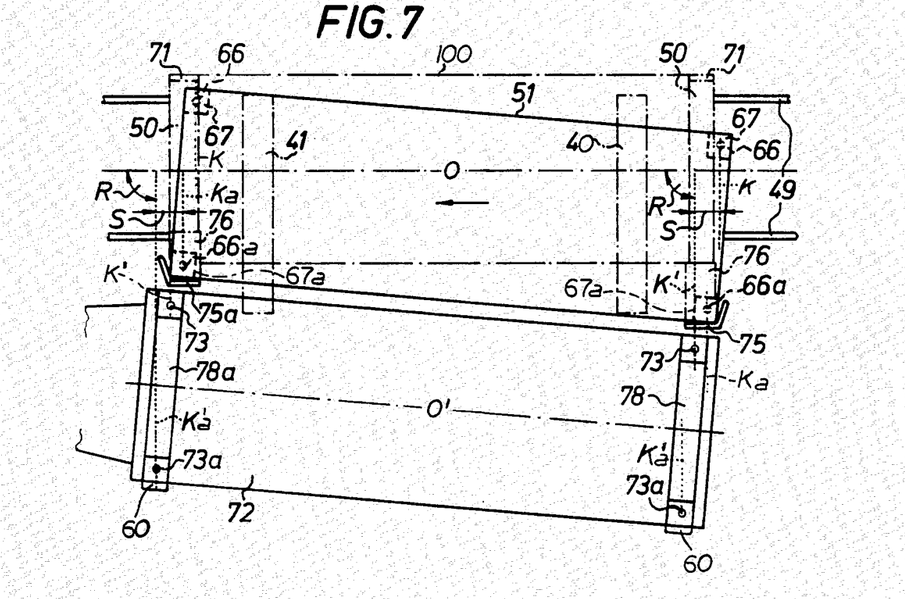
FIG. 7 schematically illustrates, in plan view, the transfer of a container between the truck and the vehicle partly seen in FIGS. 5 and 6.

While there is never a deviation from parallelism between transfer vehicles and flatcars, such parallelism is by no means assured in the case of a truck 72 roughly aligned with a transfer vehicle 100 (or 400) on one of the roadside tracks, as illustrated in FIGS. 5–7. In order to facilitate a container transfer also in that case, I provide the roadside ends of the outermost bars 50 of these vehicles with slidable extensions 76 carrying abutments 75 with wings 79 adjoining same at an obtuse angle to guide roadside corner fittings 67a of a container 51 into engagement with these abutments. (For the handling of containers of fractional length, the inner bars 50 may be similarly equipped except that their wings 79 ought to be downwardly retractable or foldable so as not to interfere with the movement of longer containers.) Each extension 76 is designed as a carriage with sidewalls 81 and a front wall 80, hugging the associated bar 50, and with a guide roller 74 engaging the underside of that bar. The hollow bar 50 is formed with a sawtooth rack 85 for backstopping the carriage 76 in a selected position by means of a pawl 83 pivoted to abutment 75, the pawl having a handle 86 to enable its disengagement from rack 85 as well as a manual shifting of the carriage. Alternatively, the carriage may be automatically displaceable by a leadscrew with self-locking threads on bar 50 mating with a nut on the carriage.

A contact 89a in the interior of carriage 76, connected to the microprocessor via an extensible link 89b and a line 89c, slides along a resistance wire 89 secured to bar 50 which is connected via a similar extensible link 90 to a terminal 88 mounted on the front wall 80 of the carriage. A feeler 91, penetrating that front wall, projects beyond the outer surface 87 thereof and adjoins a contact 88a at the end of a resilient tongue 88b which closes a measuring circuit on being pressed against terminal 88 when the feeler 91 engages an outrigger or sill 78 of truck 72. Carriage 76 is also provided with a sensor 68' confronting a marker 69' on truck 72 in a position of essential alignment; since, however, the axis 0' of truck 72 will often be inclined at some small angle to the axis 0 of transfer vehicle 100, as exaggeratedly illustrated in FIG. 7, the vehicle must undergo a further corrective displacement after the container 51 to be transferred to the truck has been advanced by the outward-driven transport arms 40 into a position as shown in which its outer corner fittings 66a are stopped by inner surfaces 77 (FIG. 5) of the abutments 75 of both carriages 76 which were previously moved (manually or automatically) into the outrigger-contacting position represented in phantom lines in FIG. 5. The resistances inserted by the associated sliding contacts 89a into the respective measuring circuits inform the microprocessor of the extent to which the vehicle 100 must be shifted in order to let lines K, Ka, traversing bores 66, 66a of fittings 67, 67a, coincide with lines K', Kaa', traversing corner pins 73, 73a on sills 78 of truck 72, all these lines including a right angle R with vehicle axis O; the required shift has been indicated at S. In order to clear the abutments 75, backstopped by the tips 84 of pawls 83 against bars 50, the vehicular superstructure 52 including arms 40 must be further elevated whereupon the container can be moved transversely to axis O until fittings 67a are stopped by abutments 60 on truck 72 and pins 73, 73a are respectively aligned with bores 66, 66a. The container can now be lowered into positive engagement with the truck by these pins and bores. Alternatively, the maximum outward extension of each transport arm 40 may be determined by a feeler or distance sensor 82 on that arm (FIG. 6) coacting with an end stop or marker on the far side of the truck.

For a transfer of a container from truck 72 to the railborne vehicle 100, carriages 76 on bars 50 are prepositioned in the aforedescribed manner whereupon the container is lifted off the truck and moved past abutments 75 until its corner fittings 67 are stopped by abutments 71; the container, with its axis O' now parallel to the vehicular axis O, is then lowered onto bars 50 for locking by means of abutments 71 (FIGS. 3 and 4).

With containers of greater than unit length, as shown, the carriages of the more inwardly positioned bars 50 remain withdrawn into their home positions with their wings 79 retracted.

The ancillary tracks and parking areas for transfer vehicles of my improved freight-handling system may be accommodated below a roof.

I claim:

1. In a railroad station having at least one main track for freight trains with container-carrying flatcars, the combination therewith of a pair of ancillary tracks flanking said main track, respective sets of independently movable self-propelled transfer vehicles on said ancillary tracks, and support means on each transfer vehicle extendable transversely to said tracks for enabling the movement of a selected container onto such vehicle from a flatcar aligned therewith and vice versa, said support means being further extendable across at least part of said main track in the absence of a train thereon for facilitating a movement of a container from a transfer vehicle of one set onto an aligned transfer vehicle of the other set, each of said transfer vehicles comprising a wheeled base and a plurality of independently elevatable superstructures adjoining one another in the longitudinal direction of the vehicle for engagement with individual unit-size containers occupying a submultiple of the length of a flatcar, said support means comprising a pair of transversely extending transport arms on each of said superstructures, the separation of the transport arms of each pair in the direction of the tracks being identical for all pairs on all transfer vehicles of one of said sets but differs from the separation of the transport arms of the pairs on the transfer vehicles of the other of said sets for enabling an interleaved positioning of pairs of transport arms of aligned vehicles of said sets extended toward each other across said main track.

2. The combination defined in claim 1 wherein each transfer vehicle is provided with sensing means for detecting longitudinal offsets between such vehicle and a flatcar or another transfer vehicle substantially aligned therewith, further comprising a microprocessor on each transfer vehicle controlled by said sensing means thereof for actuating a vehicular drive to eliminate said longitudinal offset.

3. The combination defined in claim 2 wherein at least one of said ancillary tracks adjoins a roadway for container-handling trucks positionable alongside the last-mentioned track, the transfer vehicles on said last-mentioned track being provided with further sensing means for ascertaining angular deviations of an axis of a truck from the axis of a transfer vehicle substantially aligned therewith, said further sensing means being carried on adjustable mounting means enabling a limited horizontal swing of a container supported thereon into parallelism with either of said axes preparatorily to a transferral of such container.

4. The combination defined in claim 3 wherein said adjustable mounting means comprises a pair of horizontal bars perpendicular to said tracks, said bars having extremities proximal to said roadway provided with slidable extensions carrying said further sensing means, said extensions having locating formations engageable with coacting formations on a container resting on said bars and further having measuring means for reporting to said microprocessor the distance by which any such extension has been displaced from a normal position into proximity of an aligned truck under the control of said further sensing means, said microprocessor being programmed to command the vehicular drive to carry out a corrective longitudinal displacement in accordance with the distance determined by said measuring means.

5. The combination defined in claim 1 wherein said main track is one of a plurality of mutually parallel main tracks each flanked by a pair of associated ancillary tracks carrying respective sets of transfer vehicles, ancillary tracks associated with different main tracks lying close enough to each other to facilitate an interleaved positioning of pairs of transport arms from respective transfer vehicles thereon aligned with each other whereby a container can be transferred between vehicles so aligned.

6. The combination defined in claim 1 wherein each transfer vehicle has a width substantially greater than that of said main track, said transport arms being long enough to project with not more than half their length beyond the vehicle in a fully extended position thereof.

7. The combination defined in claim 6 wherein each transfer vehicle is further provided with railhead-gripping means operable to anchor the vehicle to the ancillary track thereof during lateral extension of said transport arms.

8. The combination defined in claim 1 wherein each of said superstructures is provided with at least two pairs of longitudinally extending shafts each carrying two rollers, said transport arms having a C-profile embracing respective rollers on said shafts.

* * * * *